United States Patent
Hyodo (10) Patent No.: US 8,127,822 B2
(45) Date of Patent: Mar. 6, 2012

(54) MANUFACTURING METHOD OF TIRE FORMING MOLD AND TIRE FORMING MOLD

(75) Inventor: Masaki Hyodo, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 815 days.

(21) Appl. No.: 12/211,870

(22) Filed: Sep. 17, 2008

(65) Prior Publication Data

US 2009/0095427 A1    Apr. 16, 2009

(30) Foreign Application Priority Data

Oct. 16, 2007   (JP) ................................. 2007-269260

(51) Int. Cl.
  *B22D 33/04*   (2006.01)
  *B22C 9/06*   (2006.01)
  *B22C 9/22*   (2006.01)

(52) U.S. Cl. .............................. 164/6; 164/137; 164/342

(58) Field of Classification Search .............. 164/6, 137, 164/342

See application file for complete search history.

(56) References Cited

U.S. PATENT DOCUMENTS 4,411,175 A      10/1983   Takahashi et al.
5,290,163 A  *   3/1994    Katsumata et al. ............. 425/47

FOREIGN PATENT DOCUMENTS

JP       56-58817           5/1981
JP       2006-159669        6/2006
JP       2006-159669 A  *   6/2006

* cited by examiner

*Primary Examiner* — Kevin P Kerns (74) *Attorney, Agent, or Firm* — Fish & Richardson P.C.

(57) ABSTRACT

A manufacturing method of a tire forming mold in which an annular mold portion is constituted by a combination of sectors includes a step of manufacturing a circular arc shaped inner segment provided with a concavo-convex shape, a step of dividing the inner segment by a non-flat surface division so as to obtain a first segment piece and a second segment piece, and a step of incorporating the first segment piece into an inner peripheral side of a back segment of one sector out of a pair of sectors which are adjacent to each other in the tire circumferential direction, incorporating the second segment piece into an inner peripheral side of a back segment of the other sector, and arranging the non-flat surface divided surface in an end surface of the sector.

2 Claims, 7 Drawing Sheets

MANUFACTURING METHOD OF TIRE FORMING MOLD AND TIRE FORMING MOLD

BACKGROUND OF THE INVENTION

1. Field of the Invention

The present invention relates to a manufacturing method of a tire forming mold for vulcanization forming a tire and the tire forming mold.

2. Description of the Related Art

The tire forming mold mentioned above is constructed by combining a plurality of mold portions, and can be roughly classified into a two-piece type and a segmented type based on the mold structure. In the latter, an annular mold portion coming into contact with a tread surface of a tire is constructed by a plurality of sectors divided in a tire circumferential direction, and an inner peripheral surface of each of the sectors is provided with a frame portion for forming a groove portion and a concave portion for forming a land portion. Further, in the case where a notch called as a sipe is formed in the land portion, a thin blade is provided within the concave portion. The sectors are away from each other in a mold open state, however, the sectors get together so as to be connected as a circular ring shape in a mold clamping state and confront end surfaces with each other.

The sector is classified into an integral type and a piece type based on its structure. The integral type sector is integrally manufactured by an aluminum or the like as disclosed in Japanese Unexamined Patent Publication No. 56-58817. On the other hand, the piece type sector is constructed by incorporating a lot of pieces which are previously manufactured individually into an inner peripheral side of a back segment as disclosed Japanese Unexamined Patent Publication No. 2006-159669. In the piece type, it is possible to discharge an air from a lot of small gaps formed between the pieces, however, there is a tendency that the number of the parts is increased.

In the segmented type tire forming mold, since an end surface of the sector travels down through the frame portion forming a transverse groove or cuts across the blade in cooperation with a complexity of a tread pattern in the case of dividing the annular mold portion by a flat surface (dividing by a flat surface including a tire axis), a breakage of a thinned frame portion and a shortened blade comes into problem. On the contrary, in the case of employing a non-flat surface division, it is possible to appropriately avoid the thinning of the blade portion or the shortening of the blade by forming an end surface of the sector by a curved surface or a zigzag surface or the like, and it is possible to solve the problem mentioned above.

As mentioned above, in the light of suppressing the breakage of the frame portion and the blade, it is said that the non-flat surface division is more advantageous than the flat surface division. However, since the non-flat surface division has a high difficulty for working in comparison with the flat surface division, it is not easy to finish the end surface of the sector at a high precision. If the working precision of the end surface of the sector is low, a gap is formed at a time of confronting the end surfaces with each other, and a rubber burr is generated on the tread surface of the tire at a time of vulcanization molding. Accordingly, it becomes important to closely attach the end surfaces of the sectors to each other at a high precision even in the non-flat surface division.

Japanese Unexamined Patent Publication No. 56-58817 describes an apparatus for manufacturing an integral type sector by dividing in a non-flat surface manner an integrally cast molded ring-shaped casting. However, this apparatus is provided with a large-sized rotary table for retaining the ring-shaped casting, which is a heavy load, so as to move in a circumferential direction, and a large-sized NC machine, and thus requires a large-scaled expensive equipment.

On the other hand, in the piece type sector as described in Japanese Unexamined Patent Publication No. 2006-159669, since an individual piece has a small size, it is possible to work an end surface as a non-flat surface by using a general purpose working apparatus such as a wire electric discharge machine. However, since a working error is generated in each of the end surfaces in the case of working the end surfaces of a pair of pieces which are individually manufactured, a gap tends to be formed at a time of confronting them. Accordingly, it is necessary to carry out a lapping work after working the end surface as the non-flat surface, which raises a problem that the work is complicated.

SUMMARY OF THE INVENTION

The present invention is made by taking the actual condition mentioned above into consideration, and an object of the present invention is to provide a manufacturing method of a tire forming mold which can simply divide an annular mold portion by a non-flat surface and can closely attach end surfaces of sectors to each other at a high precision, and the tire forming mold.

The object can be achieved by the following present invention. That is, the present invention provides a manufacturing method of a tire forming mold in which an annular mold portion brought into contact with at least a tread portion of a tire is constituted by a combination of sectors which are divided in a tire circumferential direction, comprising:

a step of manufacturing a circular arc shaped inner segment provided with a concavo-convex shape corresponding to a tread pattern in an inner peripheral surface;

a step of dividing the inner segment by a non-flat surface division so as to obtain a first segment piece and a second segment piece; and a step of incorporating the first segment piece into an inner peripheral side of a back segment of one sector out of a pair of sectors which are adjacent to each other in the tire circumferential direction, incorporating the second segment piece into an inner peripheral side of a back segment of the other sector, and arranging the non-flat surface divided surface in an end surface of the sector.

In the present invention, the circular arc shaped inner segment provided with the concavo-convex shape corresponding to the tread pattern in the inner peripheral surface is manufactured to divide the inner segment into two sections in accordance with the non-flat surface division. Since the non-flat surface division aims at the inner segment having the shorter peripheral length than the annular mold portion, it is possible to simply carry out by using the general purpose working apparatus such as a wire electric discharge machine, without requiring any large-scaled expensive equipment. Further, it is possible to appropriately avoid the thinning of the frame portion and the shortening of the blade based on the non-flat surface division. In this case, the non-flat surface division means a division which does not correspond to the flat surface division (the division by the flat surface including the tire axis), and divides between the sectors, for example, by a curved surface or a zigzag surface or the like.

Next, the first segment piece and the second segment piece obtained by the non-flat surface division are incorporated into the inner peripheral side of the back segment of the sector. At this time, out of a pair of sectors which are adjacent to each other in the tire circumferential direction, the first segment piece is incorporated into the back segment of the one sector, the second segment piece is incorporated into the back segment of the other sector, and the non-flat surface divided surface is arranged in the end surface of the sector. Since the non-flat surface divided surface is obtained by dividing the same inner segment into two sections, an influence of the working error is small, and it is possible to closely attach the end surfaces of the sectors to each other at a high precision without carrying out the lapping work.

In the above method, it is preferable that the first segment piece and the second segment piece obtained by dividing the independent inner segments by the non-flat surface are incorporated respectively into the inner peripheral sides of the back segments, and end surfaces of both the segment pieces formed by the flat surface are brought into contact with each other.

In accordance with the method mentioned above, since one half of the inner peripheral side portion of the sector is constructed by the first segment piece, and the remaining half thereof is constructed by the second segment piece, there is an advantage that the number of the parts and the working number are reduced in comparison with the piece type sector. Further, the first and second segment pieces incorporated into the same back segment tend to be closely attached to each other at a high precision because the end surfaces formed by the flat surfaces are brought into contact with each other. Accordingly, there is a little risk that the rubber burr is generated. In addition, since they are not pressure contacted at a time of the mold clamping motion, there is a small risk that the frame portion and the blade are broken.

Further, the present invention provides a tire forming mold in which an annular mold portion brought into contact with at least a tread portion of a tire is constituted by a combination of sectors which are divided in a tire circumferential direction, wherein the sectors are constructed by incorporating a first segment piece and a second segment piece formed by dividing a circular arc shaped inner segment provided with a concavo-convex shape corresponding to a tread pattern in an inner peripheral surface into an inner peripheral side of a back segment, and wherein out of a pair of sectors which are adjacent to each other in the tire circumferential direction, the first segment piece incorporated into an inner peripheral side of the back segment of one sector and the second segment piece incorporated into an inner peripheral side of the back segment of the other sector are formed by dividing the same inner segment into two sections by the same non-flat surface, and the non-flat surface divided surfaces are arranged in an end surface of the sector.

In accordance with the tire forming mold according to the present invention, it is possible to simply carry out the non-flat surface division of the annular mold portion by using the general purpose working apparatus such as the wire electric discharge machine without using any large-scaled expensive equipment as mentioned above. Further, it is possible to closely attach the end surfaces of the sectors formed by the non-flat surface at a high precision without carrying out the lapping work, and it is possible to preferably suppress the generation of the rubber burr on the tread surface of the tire.

In the above structure, it is preferable that the first segment piece and the second segment piece obtained by dividing the independent inner segments by the non-flat surface are incorporated respectively into the inner peripheral sides of the back segments, and end surfaces of both the segment pieces formed by the flat surface are brought into contact with each other.

In accordance with the structure mentioned above, since one half of the inner peripheral side portion of the sector is constructed by the first segment piece, and the remaining half thereof is constructed by the second segment piece, there is an advantage that the number of the parts and the working number are reduced in comparison with the piece type sector. Further, the first and second segment pieces incorporated into the same back segment tend to be closely attached to each other at a high precision because the end surfaces formed by the flat surfaces are brought into contact with each other. Accordingly, there is a little risk that the rubber burr is generated. In addition, since they are not pressure contacted at a time of the mold clamping motion, there is a small risk that the frame portion and the blade are broken.

DETAILED DESCRIPTION OF THE PREFERRED EMBODIMENTS

Figure 1:
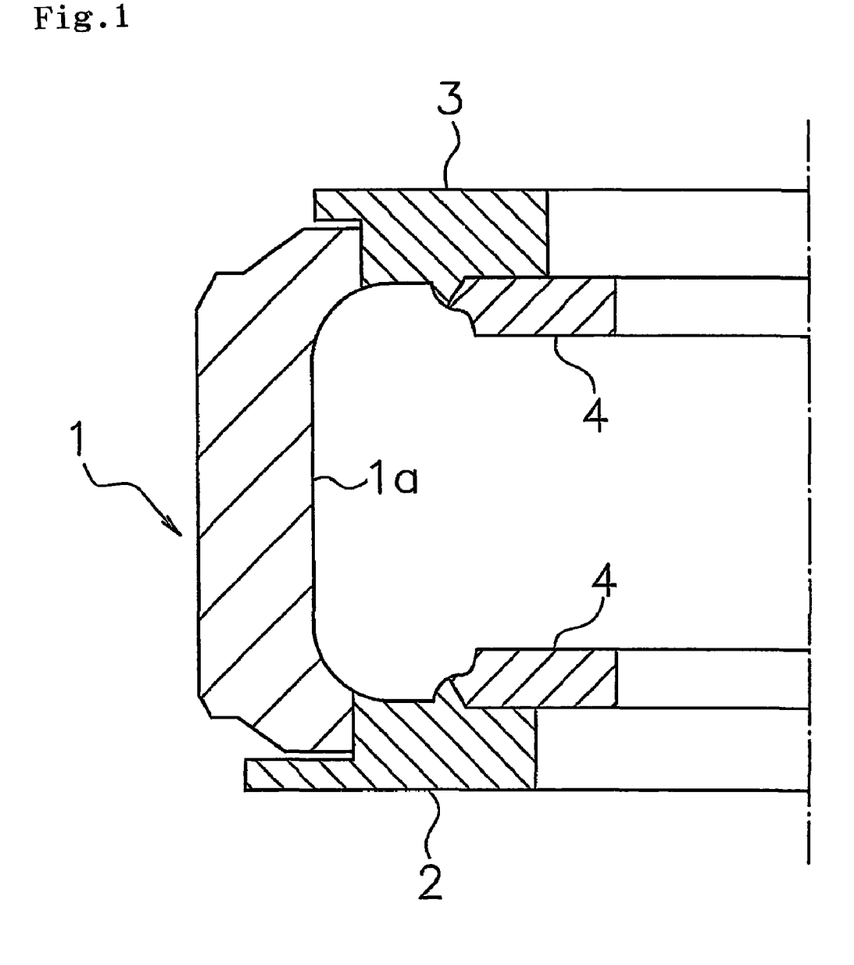
FIG. 1 is a vertical cross sectional view of an example of a tire forming mold in accordance with the present invention.

An embodiment of the present invention will be explained with reference to the drawings. FIG. 1 is a vertical cross sectional view of an example of a tire forming mold in accordance with the present invention, and shows a mold clamping state. In the FIG. 1, a green tire (not shown) is set in such a manner that a tire axial direction is arranged up and down. In other words, a right direction in FIG. 1 corresponds to an inner side in a tire diametrical direction, and a left direction corresponds to an outer side in the tire diametrical direction. The tire forming mold (hereinafter, there is a case of being simply referred to as a forming mold) is the segmented type.

The forming mold in accordance with the present embodiment is provided with an annular mold portion 1 with which a tread portion of a tire is brought into contact, a lower mold portion 2 with which a side wall portion in a lower side is brought into contact, and an upper mold portion 3 with which a side wall portion in an upper side is brought into contact. A bead ring 4 is provided in an inner side in the tire diametrical direction of the lower mold portion 2 and the upper mold portion 3, and the structure is made such that a bead of the tire can be fitted. In the mold open state, the annular mold portion 1 and the upper mold portion 3 move up and the annular mold portion 1 displaces to an outer side in a tire diametrical direction. The displacement of the mold portion mentioned above is carried out by an opening and closing mechanism (not shown).

A concavo-convex shape constituted by a frame portion for forming a groove portion and a concave portion for forming a land portion is formed in an inner peripheral surface 1a of the annular mold portion 1. The inner peripheral surface 1a is pressed against the tread surface of a green tire at a time of the vulcanization molding, whereby a predetermined tread pattern is formed. The inner peripheral surface 1a is provided with a blade for forming a sipe and a vent hole for discharging an air out of the mold as needed. In the present invention, the concavo-convex shape formed in the inner peripheral surface 1a is not particularly limited.

Figure 2:
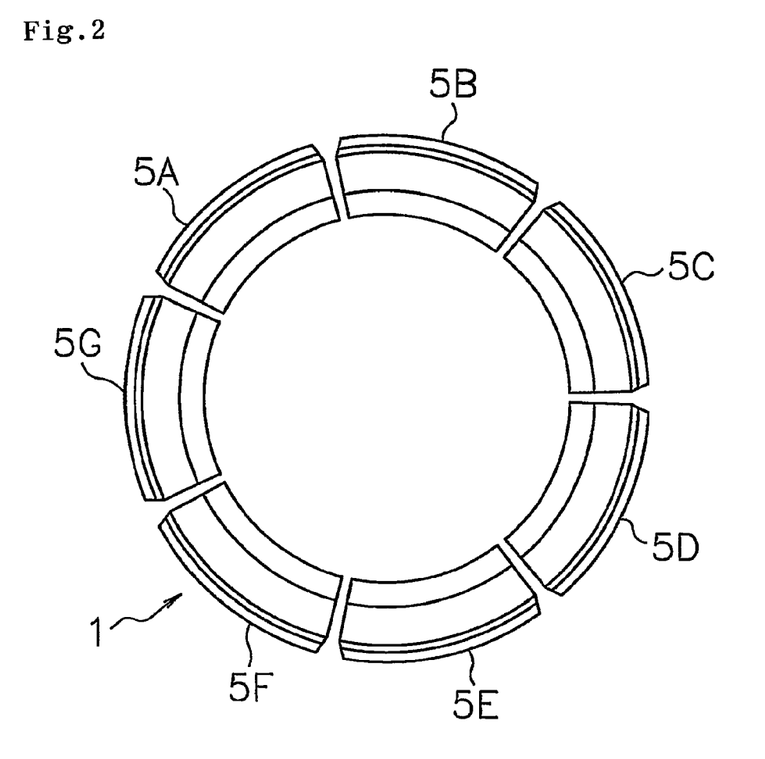
FIG. 2 is a plan view of an annular mold portion.

The annular mold portion 1 is constituted by a combination of sectors 5A to 5G divided in the tire circumferential direction, as shown in FIG. 2. In the present invention, the annular mold portion 1 is divided by the non-flat surface, and end surfaces of each of the sectors 5A to 5G are formed as the non-flat surface. The sectors 5A to 5G are away from each other in the mold open state, however, the sectors 5A to 5G get together in the mold clamping state so as to be connected as a circular ring shape, and come to a state in which the end surfaces are confronted. In the present embodiment, there is shown an example in which the annular mold portion 1 is divided into seven sections and circumferential lengths of the sectors 5A to 5G are approximately identical, however, in the present invention, the dividing number of the annular mold portion is not particularly limited, but the circumferential lengths of the sectors may be different from each other.

Figure 3:
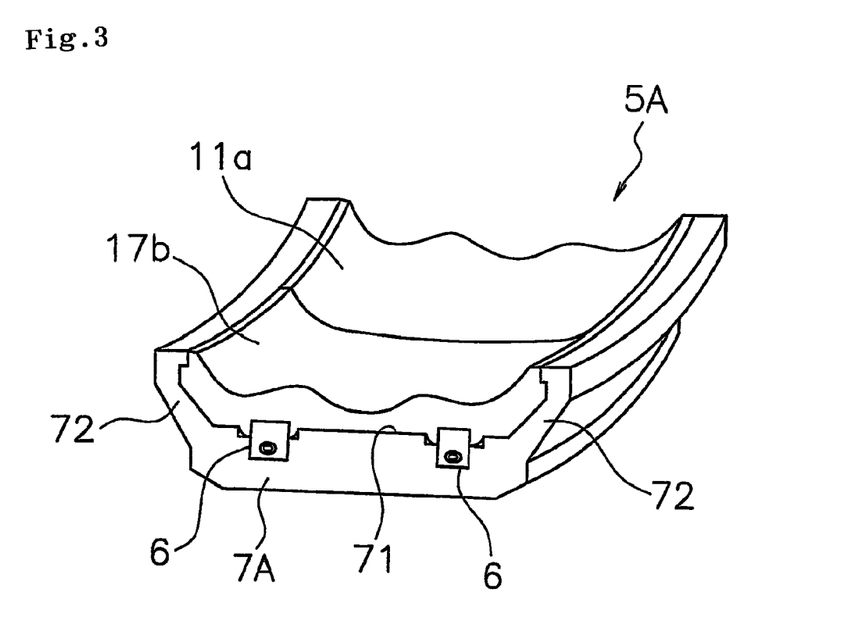
FIG. 3 is a perspective view of the sector.

FIG. 3 is a perspective view of the sector 5A, and shows in a state in which an inner peripheral surface is directed upward. The sector 5A is constructed by incorporating a first segment piece 11a and a second segment piece 17b into an inner peripheral side of the back segment 7A. Although an illustration is omitted, a concavo-convex shape is formed in inner peripheral surfaces of both the segment pieces 11a and 17b. Both the segment pieces 11a and 17b are fitted to a concave fitting portion 71 formed in an inner peripheral side of the back segment 7A, and are supported from an outer side in a tire width direction by both side arm portions 72.

A stopper member 6 for preventing both the segment pieces 11a and 17b from falling away is attached to the end surface of the sector 5A. The stopper member 6 is constructed by a set of rectangular metal plates which are arranged so as to be spaced in the tire width direction, and is fixed to the back segment 7A by a bolt. Since the stopper member 6 goes into the concave portion formed in both the segment pieces 11a and 17b, the stopper member 6 is not an obstacle at a time of confronting the end surfaces of the sectors to each other.

An aluminum material is exemplified as a raw material of both the segment pieces 11a and 17b. The aluminum material is a concept including an aluminum alloy in addition to a pure aluminum raw material, for example, there can be listed up Al—Cu, Al—Mg, Al—Mg—Si, Al—Zn—Mg, Al—Mn and Al—Si. On the other hand, a steel material is exemplified as a raw material of the back segment 7A.

Both the segment pieces 11a and 17b are formed by a flat surface in which an end surface in one side is orthogonal to the tire circumferential direction, and the end surfaces thereof are brought into contact with each other. Further, the end surface in the other side is formed by a non-flat surface (a wave-shaped curved surface in the present embodiment), and the end surfaces are respectively arranged in the end surface of the sector 5A. Near the end surface of the sector 5A, the thinning of the frame portion and the shortening of the blade provided in the inner peripheral surface are appropriately avoided.

Figure 4:
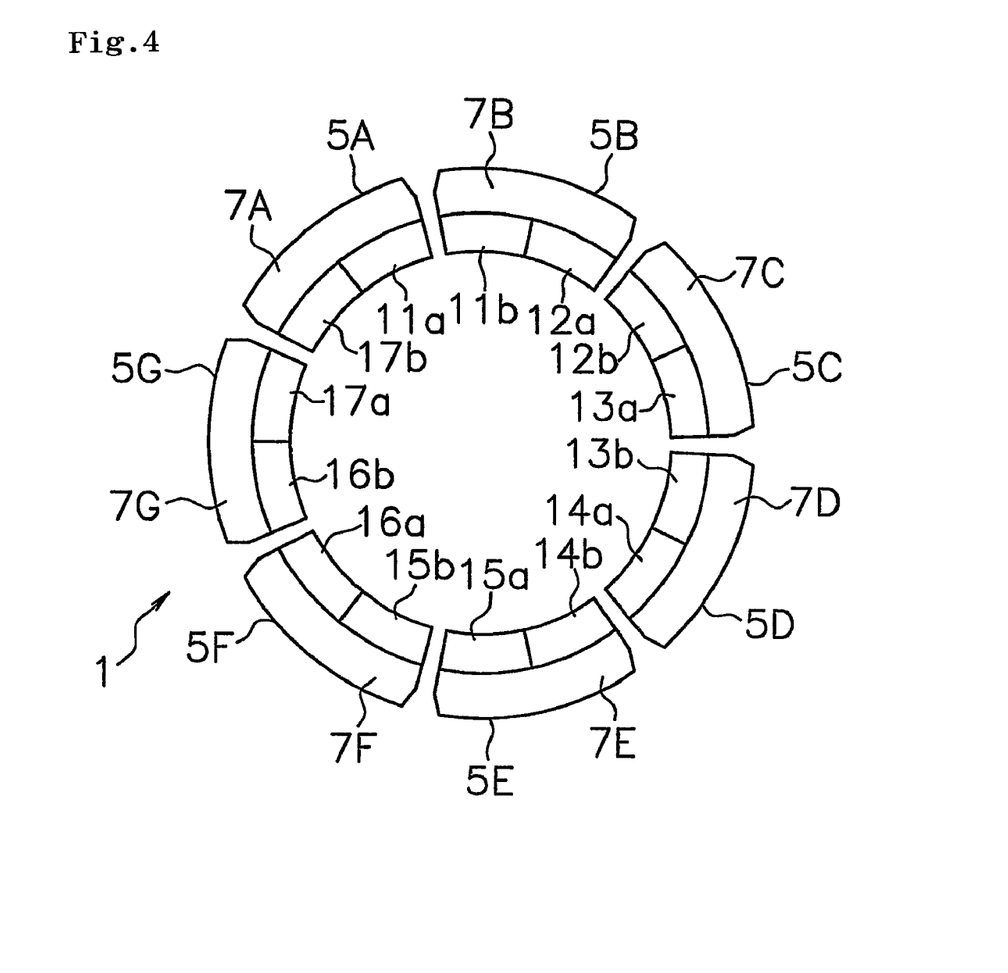
FIG. 4 is a plan view schematically showing an internal structure of the annular mold portion.

The sectors 5B to 5G have a similar structure as the sector 5A, and are constructed by incorporating first segment pieces 12a to 17a and second segment pieces 11b to 16b into the inner peripheral side of the respective back segments 7B to 7G. A combination of the back segment and the segment piece in each of the sectors 5A to 5G is as shown in FIG. 4. In the present embodiment, there is shown an example in which peripheral lengths of the segments are approximately equal, however, they may be different from each other.

Figure 5:
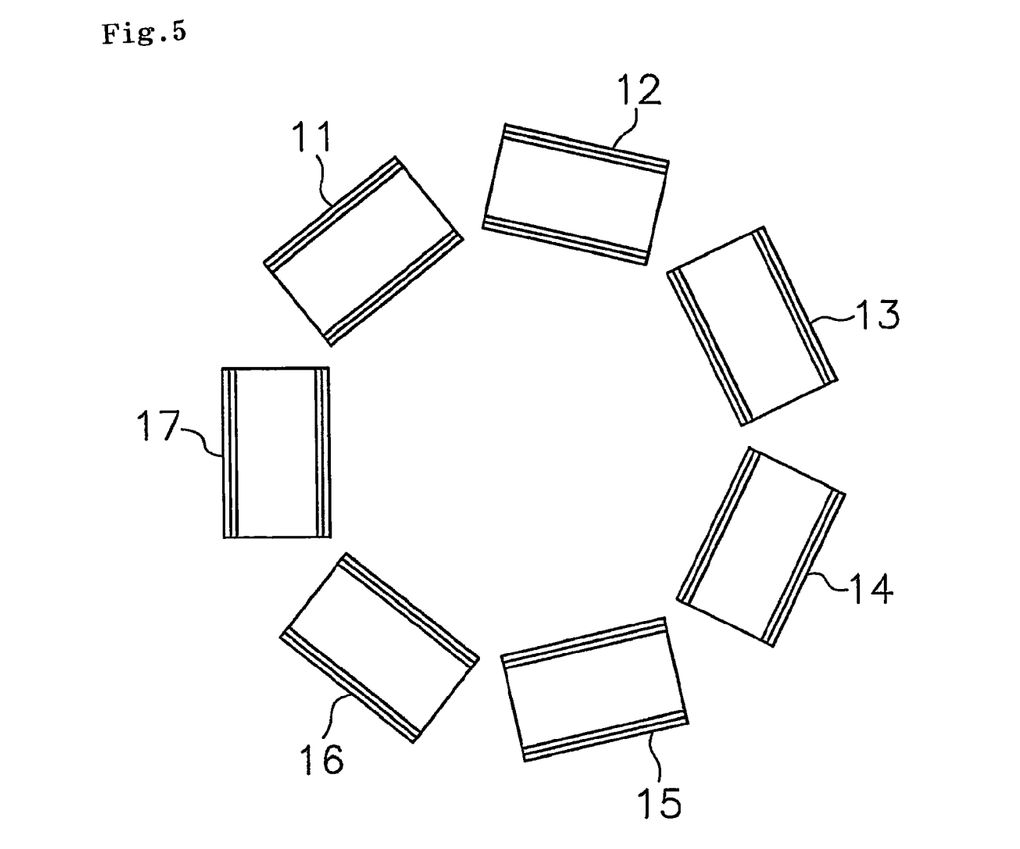
FIG. 5 is a view at a time of viewing each of inner segments from an inner peripheral side.
Figure 6:
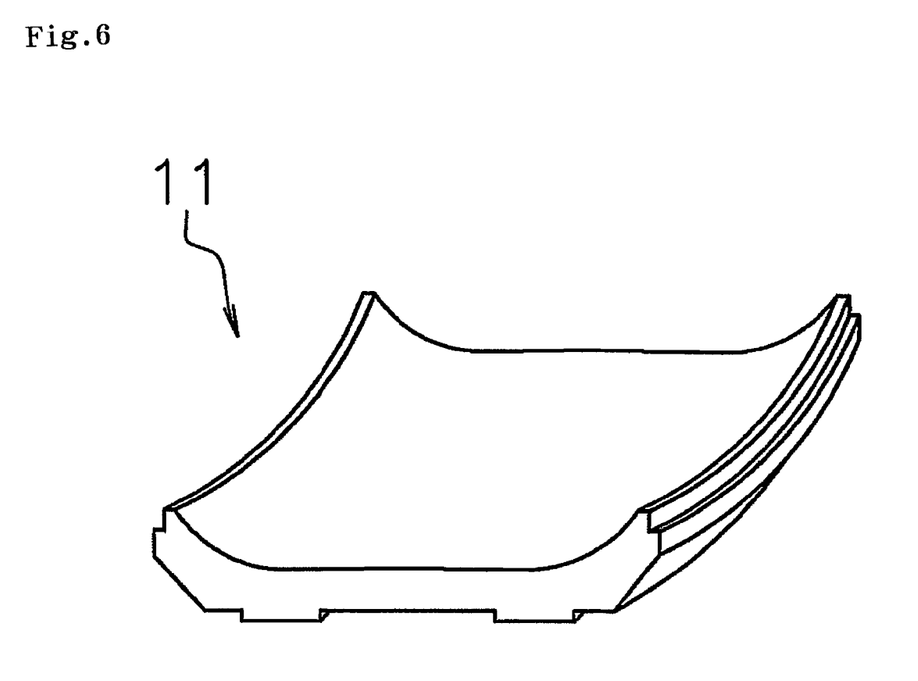
FIG. 6 is a perspective view of the inner segment.

A description will be given of a manufacturing method of the tire forming mold. First of all, inner segments 11 to 17 shown in FIG. 5 are manufactured. In FIG. 6, only the inner segment 11 is shown, however, the other inner segments 12 to 17 are formed in a similar manner. The inner segment 11 is a circular arc shaped member provided with a concavo-convex shape corresponding to the tread pattern in its inner peripheral surface, and has a cross sectional shape capable of being fitted to a concave fitting portion of the back segment, and both end surfaces thereof are formed by a flat surface which is orthogonal to the tire circumferential direction. The inner segment 11 can be integrally manufactured by casting, however, may be manufactured by dividing a casting having a longer peripheral length by a flat surface.

Figure 7:
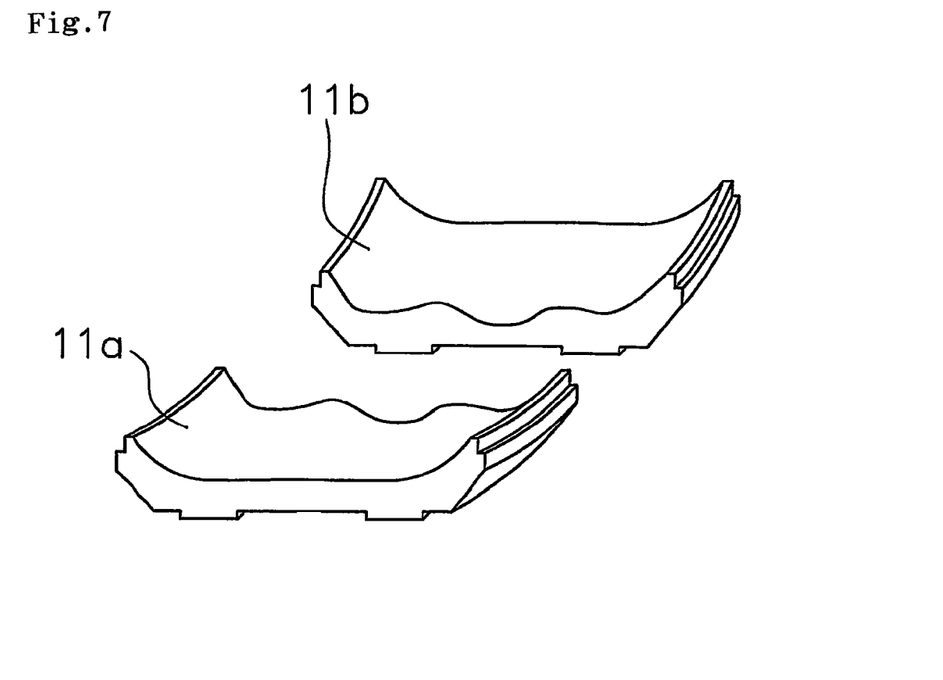
FIG. 7 is a view in a state of dividing the inner segment shown in FIG. 6 by a non-flat surface.
Figure 8:
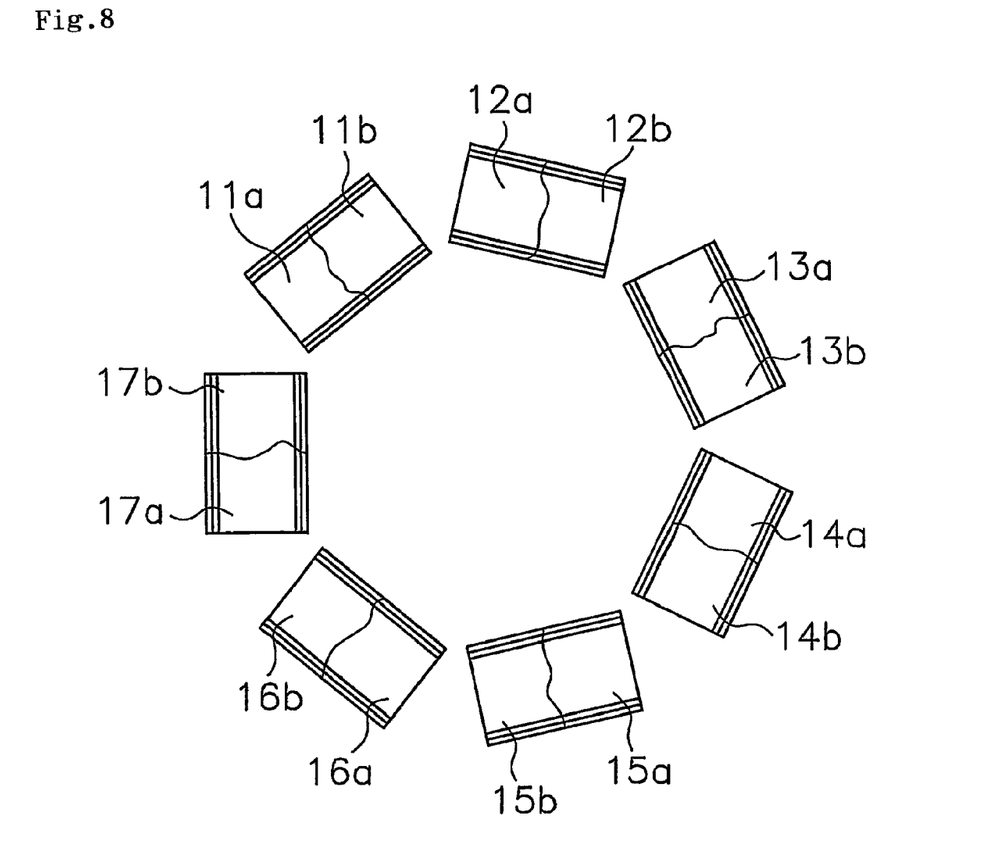
FIG. 8 is a view in a state of dividing the inner segment shown in FIG. 5 by a non-flat surface.

Next, as shown in FIG. 7, the inner segment 11 is divided into two sections in the circumferential direction in accordance with the non-flat surface division, whereby the first segment piece 11a and the second segment piece 11b are obtained. Since the non-flat surface division mentioned above aims at the inner segment 11 having a comparatively short peripheral length, it is possible to simply and inexpensively work by the wire electric discharge machine or the like. In the non-flat surface division mentioned above, it is possible to avoid the thinning of the frame portion and the shortening of the blade by appropriately setting the division surface. With regard to the other inner segments 12 to 17, the first segment pieces 12a to 17a and the second segment pieces 12b 17b are obtained by dividing into two sections by the non-flat surface as shown in FIG. 8.

Figure 9:
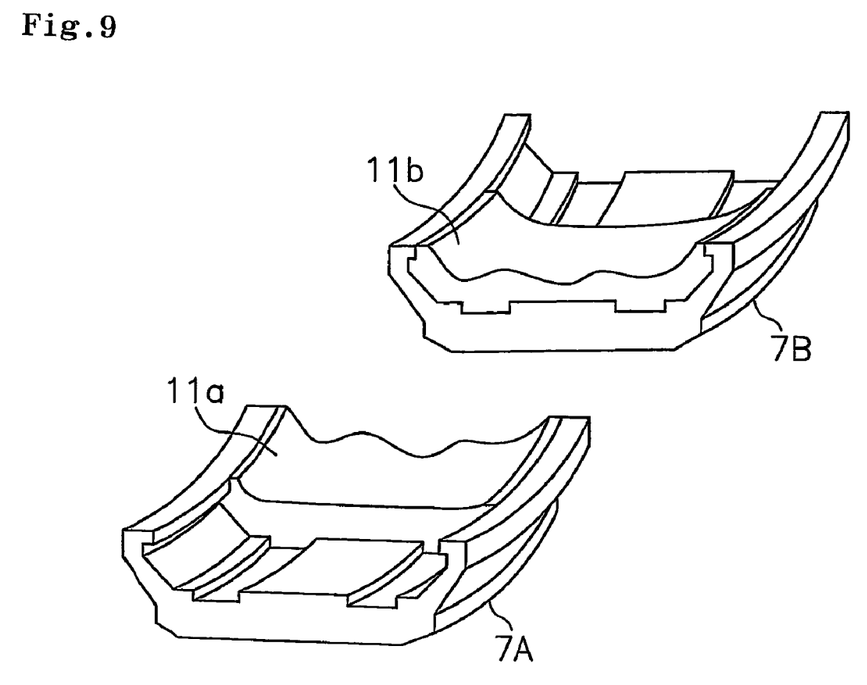
FIG. 9 is a view showing a state in which the inner segment is incorporated into a back segment.

Further, as shown in FIG. 9, the first segment piece 11a is incorporated into the inner peripheral side of the back segment 7A of the sector 5A in a pair of sectors 5A and 5B which are adjacent to each other in the tire circumferential direction, the second segment piece 11b is incorporated into the inner peripheral side of the back segment 7B of the sector 5B, and the non-flat divided surfaces are arranged in the end surfaces of the sectors 5A and 5B. With regard to the other inner segments 12 to 17, in a similar manner, the first segment pieces 12a to 17a and the second segment pieces 12b to 17b are incorporated into the back segments of a pair of sectors which are adjacent to each other in the tire circumferential direction, and the non-flat surface divided surfaces are arranged in the end surface of the sector, as shown in FIG. 4. As a result, the divided surface between the sectors forms the non-flat surface, and the annular mold portion 1 is divided by the non-flat surface.

The stopper member 6 is attached to the back segment 7A after the first segment piece 11a and the second segment piece 17b are incorporated thereto, whereby the sector 5A is constructed as shown in FIG. 3. As mentioned above, the first segment piece 11a and the second segment piece 17b are respectively obtained by dividing the independent inner segments (the inner segments 11 and 17). In this case, the first segment piece 11a and the second segment piece 17b may be simultaneously incorporated into the inner peripheral side of the back segment 7A.

In the sectors 5A and 5B which are adjacent to each other in the tire circumferential direction, the end surfaces thereof are confronted to each other at a time of the mold clamping motion, and the first segment piece 11a and the second segment piece 11b are brought into contact with each other. Since the contact surfaces correspond to the divided surfaces at a time of dividing the inner segment 11 into two sections, the influence of the working error is small. For example, in the case of the wire electric discharge machine, only the error based on the variation of the electric discharge voltage is applied. Accordingly, it is possible to closely attach the end surfaces of the sectors 5A and 5B at a high precision without carrying out the lapping work.

Further, in the sector 5A, the first segment piece 11a and the second segment piece 17b bring the end surfaces formed by the flat surfaces into contact with each other, however, if they are formed by the flat surface as mentioned above, it is easy to work at a high precision and a suitable close contact state can be easily obtained. Therefore, the risk that the rubber burr is generated is reduced. In addition, since they are not pressure contacted at a time of the mold clamping motion, there is a small risk that the frame portion and the blade are broken.

The present invention is not limited to the embodiment mentioned above, but can be improved and modified variously within the scope of the present invention. For example, in the non-flat surface division of the annular mold portion, it is possible to employ the division by the zigzag surface and the division by the inclined surface which is inclined with respect to the tire width direction, in place of the division by the curved surface such as the embodiment mentioned above.

What is claimed is:

1. A manufacturing method of a tire forming mold in which an annular mold portion brought into contact with at least a tread portion of a tire is constituted by a combination of sectors which are divided in a tire circumferential direction, comprising:

a step of manufacturing a circular arc shaped inner segment present along a tire circumferential direction and provided with a concavo-convex shape corresponding to a tread pattern in an inner peripheral surface;

a step of dividing the inner segment by a non-flat surface division so as to obtain a first segment piece and a second segment piece; and a step of incorporating the first segment piece into an inner peripheral side of a back segment of one sector out of a pair of sectors which are adjacent to each other in the tire circumferential direction, incorporating the second segment piece into an inner peripheral side of a back segment of the other sector, and arranging the non-flat surface divided surface in each end surface in a tire circumferential direction of the one sector and the other sector.

2. The manufacturing method of a tire forming mold according to claim 1, wherein the first segment piece and the second segment piece obtained by dividing the inner segments by the non-flat surface are incorporated respectively into the inner peripheral sides of the back segments, and end surfaces of both the segment pieces formed by the flat surface are brought into contact with each other, wherein one half of the inner peripheral side portion of the sector is constructed by the first segment piece and the remaining half thereof is constructed by the second segment piece.

* * * * *